UNITED STATES PATENT OFFICE.

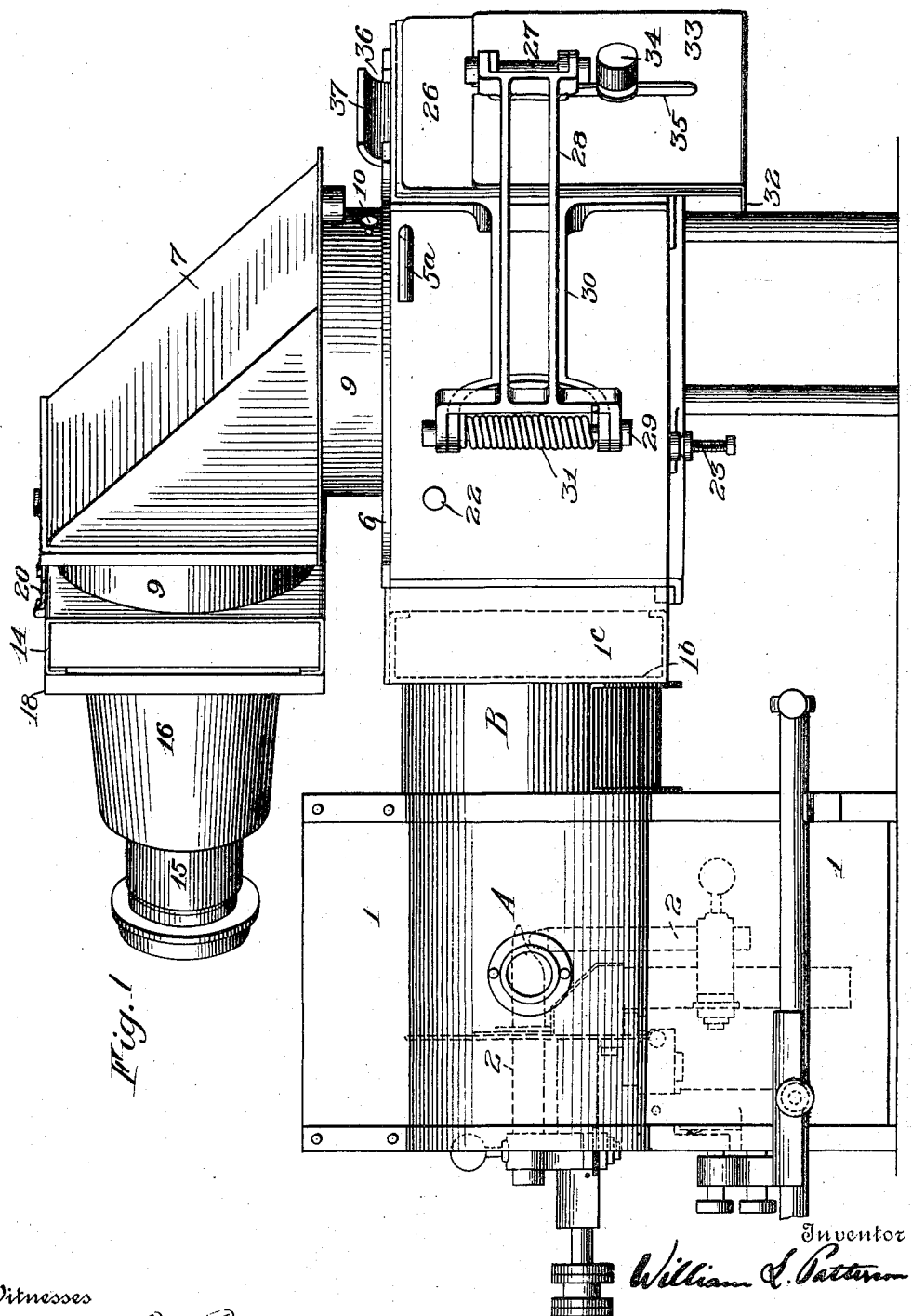

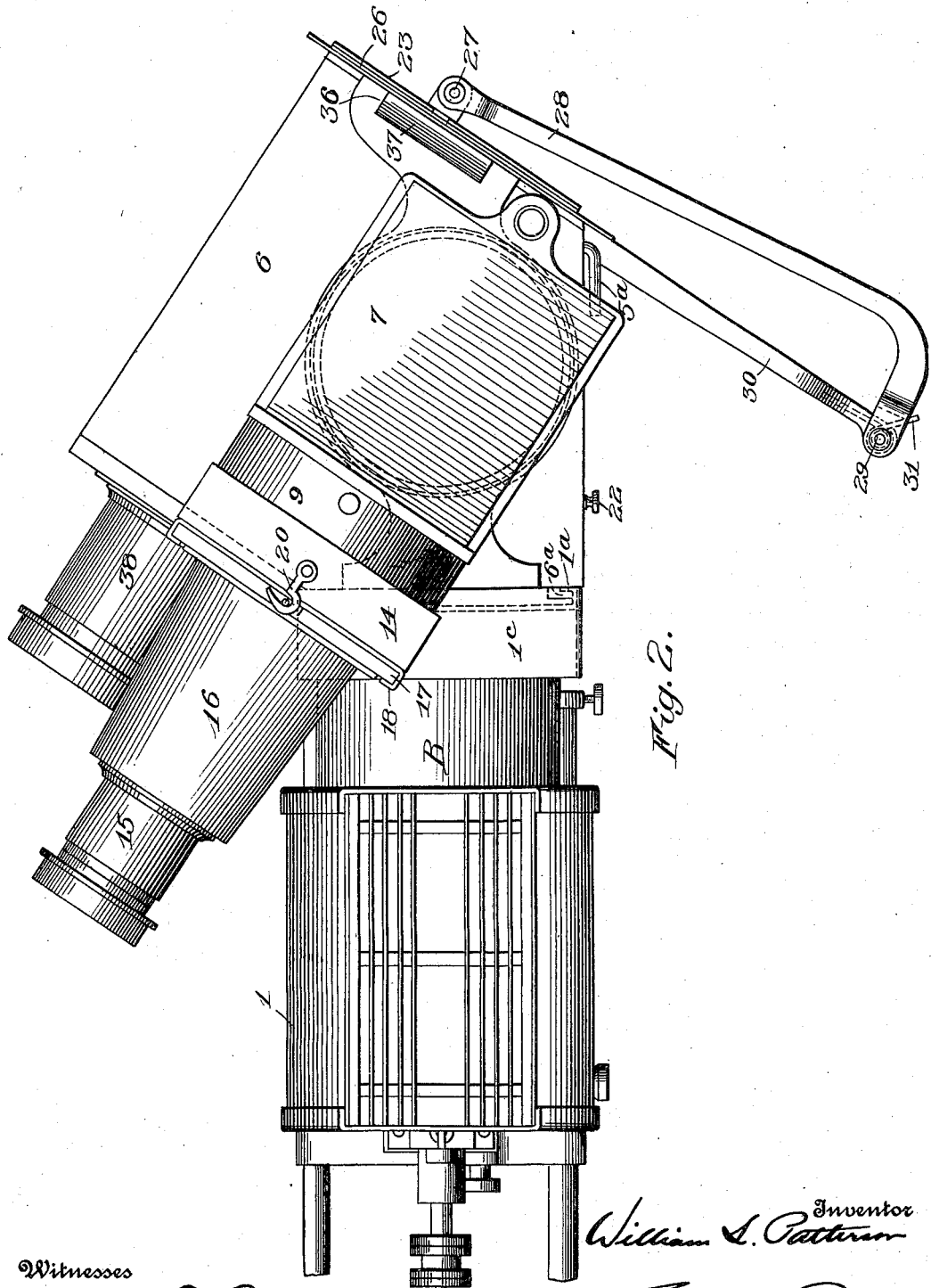

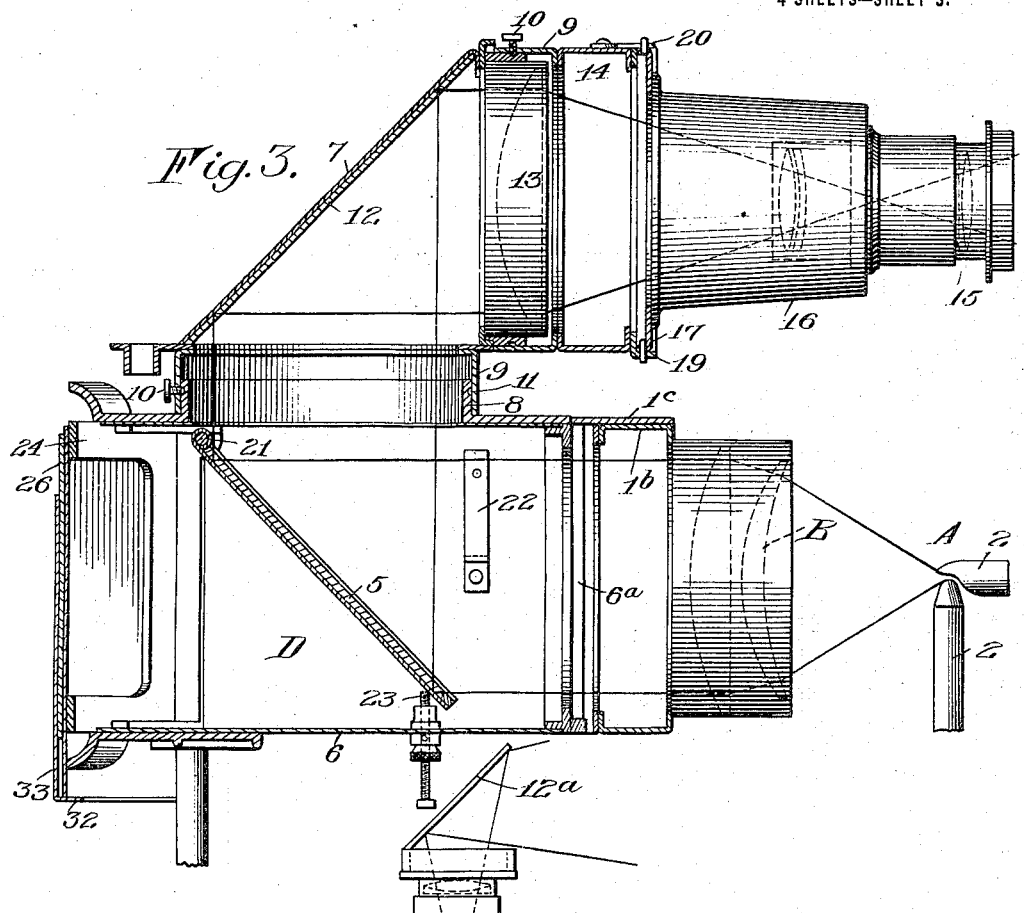
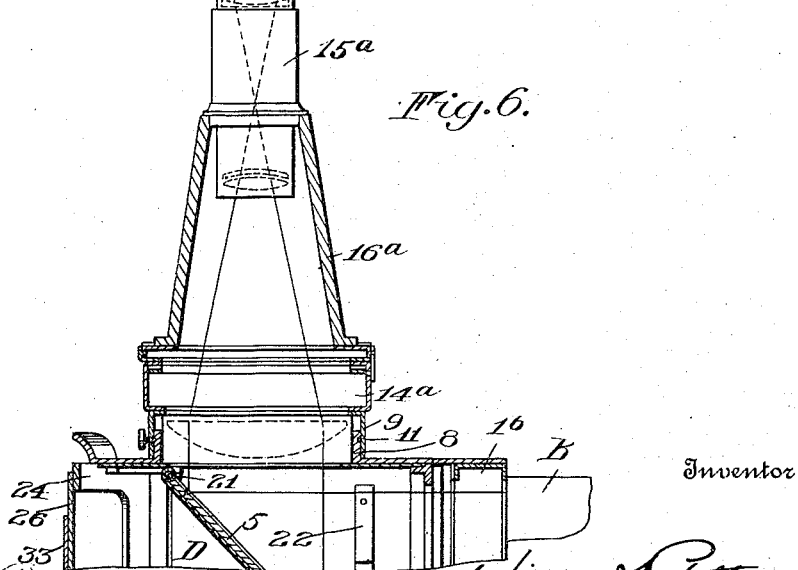

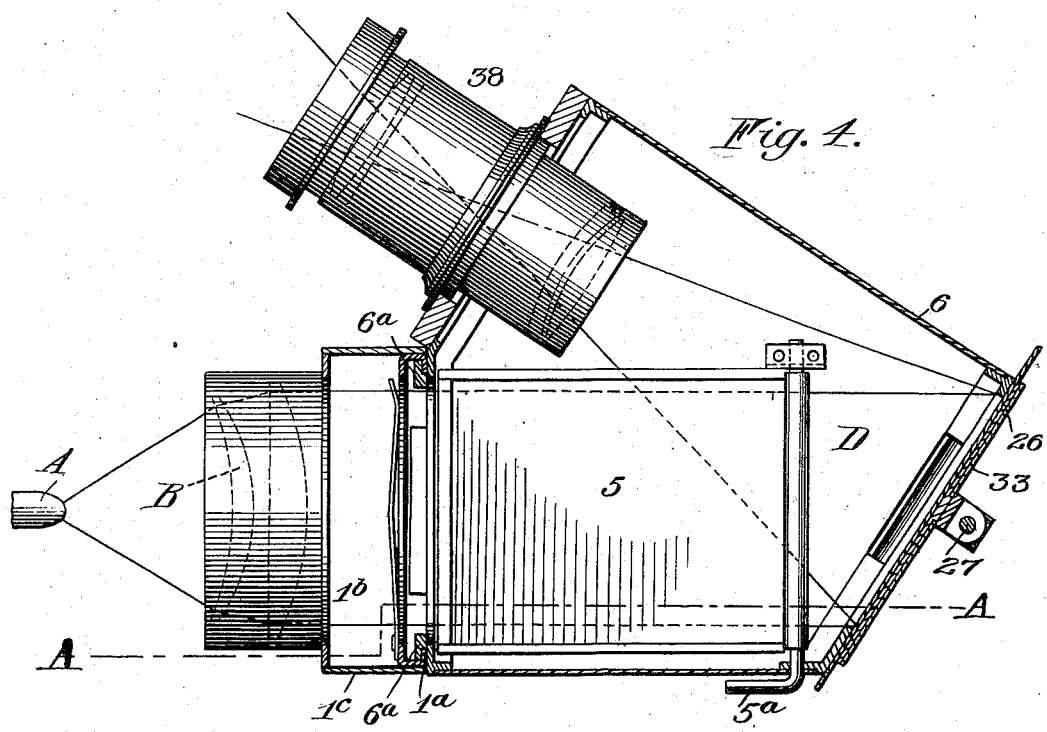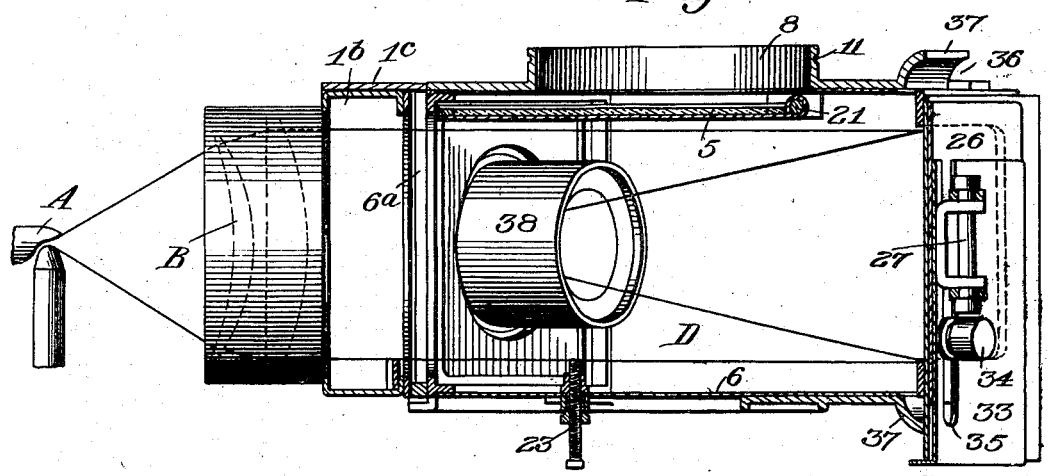

WILLIAM L. PATTERSON, OF ROCHESTER, NEW YORK, ASSIGNOR TO BAUSCH & LOMB OPTICAL CO., OF ROCHESTER, NEW YORK, A CORPORATION OF NEW YORK.

PROJECTION APPARATUS.

1,169,186.      Specification of Letters Patent.      Patented Jan. 25, 1916.

Application filed September 2, 1910. Serial No. 580,153.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of the specification, and to the reference-numerals marked thereon.

My present invention relates to projection apparatus and has for its primary object to provide a simply constructed and compact instrument which is adapted to project images of either transparent or opaque objects.

Another object of my invention is to provide an arrangement of parts whereby opaque objects, the images of which are to be projected, may be subjected to direct illumination in contradistinction to reflected rays of light.

In addition to the foregoing my invention further provides for certain adjustments of the apparatus whereby projected images of both opaque and transparent objects may be thrown upon a single screen or upon separate screens.

To these and other ends the invention consists in certain improvements and combinations of parts, all as will be hereinafter more fully described, the novel features being pointed out in the claims at the end of the specification.

In the drawings: Figure 1 is a side view of a projection apparatus constructed in accordance with this invention; Fig. 2 is a plan view; Fig. 3 is a vertical section showing the apparatus adjusted for the projection of transparent objects; Fig. 4 is a horizontal section showing the parts adjusted for the projection of opaque objects; Fig. 5 is a vertical section on line A—A of Fig. 4, and Fig. 6 is a view similar to Fig. 3 showing a modified arrangement of the lens system used for the projection of images of transparent objects.

According to this invention, the projection of images in any horizontal direction is obtained by shifting the projector and the object holder in a horizontal plane relatively to the source of illumination; and direct illumination of opaque objects is secured in a projection apparatus adapted for the projection of transparent and opaque objects, merely by shifting a deflector out of the path of the rays to the transparent object holder. In the illustrated embodiment of the invention the source of illumination A, comprising in the present instance a lamp casing 1 containing the illuminating elements 2, the rays from which, falling upon the condensing system of lenses B, are rendered parallel and directed into a dark chamber D within the casing 6. The latter and lamp casing 1 are preferably detachably connected so that either may be used without the other. In this instance, the lamp casing 1 is provided with flanges 1$^a$ which engage the flanges 6$^a$ on the casing 6. The casing 1 may also carry an object holder 1$^b$, which is used when the casing 6 is detached, the opening of this holder when not in use being closed by a plate 1$^c$.

The casing 6 in which the chamber D is provided, contains a reflector 5 arranged therein at an oblique angle to the optical axis of the condensing lens system, and in alinement directly above the reflector is a casing 7, rotating about the optical axis of the reflected rays. The casings 6 and 7 are provided with coincident openings. In this instance, the casing 6 has an annular flange 8 projecting upwardly and receiving an annular flange 9 depending from casing 7, a screw 10 being secured to the flange 9 and operating in a groove 11 to prevent the separation of the casings 6 and 7.

Within the casing 7 is arranged a reflector 12 preferably in the form of a mirror secured at an oblique angle to the optical axis of the rays from mirror 5 so as to project the rays horizontally and through a condensing lens 13 which in turn directs the rays to a holder 14 for transparent objects, said holder being preferably in the form of an open ended chamber adapted to receive the usual lantern slide holder or other devices supporting the transparent objects. From the object holder 14 the rays pass to the projecting lens system supported at the outer end of a tubular casing 16. The other end of the latter has flanges 17 fitting vertical guides 18 on the casing 7 and resting on a ledge 19, a hook 20 serving to retain the lens casing 16 in position.

The reflector 5 is adjustable permitting it to be shifted out of the path of the rays emerging from the condenser B, and with this object in view, its upper end is pivoted at 21 to the top wall of the casing so that said reflector may swing upwardly as shown in Fig. 5, a spring latch 22 operable from the exterior of the casing serving to hold the reflector in its raised position. In its lowered position, the mirror is adjustably supported in order to obtain the proper slant and to this end rests against a stop in the form of a screw 23, also adjustable from the exterior of the casing 6. A handle 5ª on the exterior of the casing may be employed for shifting the reflector 5 from the position shown in Fig. 3 to that illustrated in Fig. 5.

It is apparent that if the reflector 5 be shifted out of the path of the rays from condenser B, these rays may be employed for the direct illumination of an object, preferably an opaque object, positioned relatively to the point of intersection of the path of the light rays and the optical axis of the lower system of projection lenses, indicated by 38. This system of lenses receives the rays of light reflected from this object and projects the image of the latter onto the focusing screen. It is immaterial how the object is held at the desired point for illumination and projection, and an object holder, a part of which rests in the illuminated area, may, itself, be termed an object since, when it is not displaced by another article, it will have its image projected by said lens system. Such a holder I have arranged at an oblique angle to the optical axis of the instrument so that rays of light falling thereon will be directed into the lens system. In this instance, the object holder is formed by making the vertical rear wall 24 of the casing 6 in the form of a diaphragm with a large central opening with which coöperates an object holder. The latter is in the form of a clamp comprising a member 26 pivotally supported at 27 on one end of a link 28, the other end of which is pivoted at 29 to an arm 30 rigidly supported on the casing 6. A spring 31 may surround the pivot 29 and act on link 28 in such a manner that the member 26 is held yieldingly against the casing 6.

The clamping member 26 carries a rest 32 for the objects held thereby which is adjustable vertically to accommodate to objects of different sizes. In this instance, the rest comprises a flange on a plate 33 which is secured to the outer face of the member 26 by a thumb screw 34, a slot 35 being provided in the plate 33 to permit the vertical adjustment of the latter.

In order to provide a means for cooling the object supported by the opaque object holder air passages or openings 36 are provided in the casing 6 above and below the diaphragm or rear wall. In this instance, these openings are covered in such a manner that, while free circulation of air is provided, the passage of light is practically excluded, this being effected by inclined ribs 37 directed outwardly from the casing toward the plane of the object holder and over the openings 36.

The image of an object held against the diaphragm is projected by a system of lenses 38, whose optical axis is preferably normal to the plane of the object holder and in the horizontal plane in which the light source is located, said projector being mounted on an end wall of the casing 6. This arrangement of the lens system 38 is accomplished in the present instance by making the casing 6, forming the dark chamber D, in the form of a pentagon as best illustrated in Fig. 4, the entrance of the light from the source A into the chamber D, and its emergence therefrom through the projecting lenses 38 being through two adjacent end walls of the casing which correspond to adjacent faces of the pentagon figure. It will be noticed that the end wall opposing these two mentioned above is the one which is formed by the opaque object holder which is so disposed in its angular relation to said other walls that the illuminating rays emanating from the light source A are properly reflected from an object into the projecting lenses 38.

The instrument thus constructed is considerably shorter than other apparatus in which the projecting lenses are positioned forward of the light source. A further advantage is obtained by bringing the lenses and light source into juxtaposition as both of these parts require more or less constant attention and adjustment, and when arranged as shown the operator standing in rear of the opaque object holder has the entire instrument in front of him and he is not required to shift his position either when adjusting the various parts of the instrument or inserting opaque or transparent objects to be projected.

As before pointed out the casings 6 and 7 are detachable from lamp casing 1 and the casing 16 while projector 15 is detachable from casing 7. When so detached the flanges 17 on tubular casing 16 are adapted to be received by the ways or flanges 1ª on the lamp casing. This arrangement permits the projector 15 to directly project an image of an object on the object holder 1ᵇ, so that when the arrangement of a room will permit it, a transparent object may have its image projected without any loss of light.

For the projection of transparent objects the parts are adjusted as shown in Fig. 3, so that the light rays from the condensers B are directed onto the mirror 5 and from the latter to mirror 12. The condenser 13 receives the rays from the mirror 12 and directs them to the projector 15 through the object holder 14. The projector 15 may be turned in a horizontal plane relatively to the illuminator so that the image may be viewed at any desired position without changing the position of the illuminator.

For the projection of opaque objects, the mirror 5 is moved upwardly by means of its operating handle 5ª and is held in this position by latch 22 (see Figs. 4 and 5). The rays then pass from the condensers B directly to the opaque object holder and from the latter to the projector 38.

In Fig. 6 I have shown a modification of instrument in which the mirror 2 illustrated in Fig. 3, is omitted, the holder 14ª and the tube 16ª carrying the lens system 15ª is attached directly to the collar 8 of casing 6. When the parts are so disposed a mirror 12ª is supported on the tube 16ª and adjusted at the angle required to deflect the projected rays onto the screen.

A projection apparatus constructed in accordance with this invention permits an image to be projected in any horizontal direction without attaching reflectors to the projector or shifting the source of illumination. It also permits an opaque object to be directly illuminated so that it is possible to obtain a clear image on the screen. The apparatus is also adapted to directly illuminate transparent objects by detaching the casing supporting the opaque object holder.

A distinct advantage is obtained in the arrangement of the parts as described, in that quick changes may be made in the projecting on the focusing screen of opaque and transparent objects. This change is accomplished by merely dropping the reflector 5 when it is desired to exhibit a view of a transparency, or by elevating said reflector when an image of an opaque object is to be thrown upon the screen. It will be observed that in the projection of images of transparencies or lantern slides, that the light rays are received by the mirror 5 and directed upwardly onto the mirror 12 and then illuminate the transparency in the holder 14, the image of which is projected by the upper system of lenses 15. The bending of the light rays in this manner before illumination of the transparencies occurs is a particular advantage over an arrangement of the parts in which the rays of light are deflected after passing through the objects. Briefly stated, this is due to the fact that in the latter case where the light rays carry the image, in order to get a perfect definition of the latter on the focusing screen, it is not only necessary that the reflecting surfaces be true plane surfaces, but also that their angular positions relatively to each other and to the image and the projecting lenses be accurately maintained; otherwise distortion of the image or parts thereof will appear. Such great care is not required in the construction and positioning of the mirrors when these parts are employed merely for directing the light rays, and this not only lessens the expense of construction of an instrument of this character in the first place, but also obviates the necessity of any great care on the part of the operator in the manipulation of the instrument.

I claim as my invention:

1. The combination with a chamber, and means for directing light rays therein, of a reflector arranged in said chamber, an object-holder rotatable relatively to said reflector about an axis of the beam of rays reflected thereby, and a projector for the object-holder.

2. The combination with a suitable light source and a reflector arranged to receive the rays therefrom, of a reflector receiving rays directly from the first-named reflector, arranged at an oblique angle to the axis of the rays from said first-named reflector and rotatable about said axis, an object-holder rotatable with the last-named reflector, and a projector for the object-holder.

3. The combination with a casing and a condenser directing light rays therein, of a reflector arranged in the casing to reflect rays from the condenser upwardly, a member rotatable relatively to the casing about the axis of the rays from the reflector, an object-holder carried by said member, and a projector for said object-holder.

4. The combination with a chamber, means for directing light rays therein horizontally and a reflector arranged at an oblique angle to the light rays, of a second reflector arranged above the first and disposed to re-direct the light rays horizontally away from the chamber in a path divergent to that along which said light rays entered the casing and an object holder and projector coöperating with the second named reflector.

5. The combination with a casing, a reflector arranged therein, of means for directing light rays to the reflector, a second casing rotatable on the first named casing about the axis of the rays from the reflector, a reflector in the second-named casing receiving rays from the first-named reflector, an object-holder receiving rays from the second-named reflector, and a projector on the rotary casing for projecting the image of an object at the object-holder.

6. The combination with a casing and means for directing light rays therein, of an opaque object-holder on the casing receiving rays from the light source, a projector for said object-holder, a swinging reflector arranged to be moved into and out of the path of the rays to the object-holder, a casing rotatable on the first-named casing about the axis of the rays from the reflector, a reflector carried by the casing and located in a position to receive rays from the first-named reflector, a projector on the rotatable casing, and an object-holder interposed between the projector and the second-named reflector.

7. In a projection apparatus, the combination with a lamp casing, and an object-holder carried thereby, of a casing detachably connected to the lamp casing, a reflector and an object-holder carried by the latter casing, and a projector detachably secured to the latter casing and also adapted to be secured to the lamp casing in place of the second-named casing.

8. In a projection apparatus, the combination with a lamp casing and an object-holder carried thereby, of a second casing detachably connected to the lamp casing, an opaque object-holder on the second casing arranged to support an object in a position for receiving light rays from the lamp casing, a projector in alinement with said object-holder, a reflector movable to intercept the light rays from the lamp casing, a transparent object-holder positioned to receive said reflected light rays, and a projector for the transparent object-holder detachably supported on the second casing and adapted to be secured to the lamp casing.

9. In a projection apparatus, the combination with a casing provided with a vertical end wall having an opening, of a member yieldingly coöperating with the casing to press an object against the wall of the case to hold it in position over said opening, and an object rest carried by said member.

10. In a projection apparatus, the combination with a casing provided with an opening, of a member coöperating with the casing to clamp an object against the casing in position over said opening, and a plate adjustably secured to the face of said member and having a flange serving as a rest for articles held by the member against the casing.

11. In a projection apparatus, the combination with a source of light, a projector, and a dark chamber casing having a rear wall arranged relatively to said source of light and projector provided with an opening, said casing also having air circulating passages located in juxtaposition to said rear wall, and means for holding an object against said wall and over the opening therein in position to receive the rays of light from said light source and to be cooled by the circulation of air through said passages.

12. In a projection apparatus, the combination with a casing having two vertically disposed diverging end walls and a horizontal top wall, a source of light and a system of projection lenses located in alinement with said walls, of a holder for supporting objects in a vertical position to receive the rays of light from said light source and reflect them into the lens system, a second system of projecting lenses arranged on the top wall and extending in a direction parallel to the first system of lenses and a movable reflector in the dark chamber disposed between the object holder and light source and adapted to be adjusted into a position to intercept the rays of light from the latter and reflect them into the second lens system.

13. In a projection apparatus, the combination with a source of light, and two projecting lens systems, one for projecting images of opaque objects, the other for projecting images of transparent objects, the latter being located above the former, said two lens systems being arranged with their axes disposed substantially parallel to each other and at an acute angle to the axis of the rays of light emitted from the light source, of a dark chamber coöperating with the latter and the two lens systems, an opaque object-holder for supporting an object in position to receive the light rays and reflect them into one set of lenses, a reflector in said chamber movable into and out of the path of the light rays for deflecting the latter upwardly into the other set of lenses.

14. In a projection apparatus, the combination with a source of light and a system of projection lenses arranged relatively thereto to receive the light rays from an opaque object illuminated thereby and to project an image thereof, of a second system of projection lenses disposed in a plane to one side of and parallel to the first mentioned lens system, a reflector movable into the path of the light rays to deflect them laterally, a second reflector receiving said light rays and directing them in line with the axis of the second lens system to illuminate a transparent object interposed in the path of the reflected rays of light.

15. In a projection apparatus, the combination with two horizontally disposed systems of projection lenses arranged one above the other, a lamp arranged to project its rays of light in a direction to intersect the axis of the lower system of lenses and illuminate objects positioned relatively to said point of intersection, of a reflector movable into the path of the rays of light and arranged to reflect them upwardly and a second reflector located in rear of the upper lens system arranged to receive said light rays and reflect them into said upper lens system.

16. In a projection apparatus, the combination with two parallel and horizontally disposed lens systems arranged one above the other, a single lamp providing illumination for both of said lens systems and a holder for supporting objects in a position to receive light rays from the lamp in line with the lower lens system, of a reflector adjustable into the path of the light rays from the lamp for reflecting them upwardly and a second reflector receiving and reflecting said rays in a forward direction into the upper system of lenses.

17. In a projection apparatus, the combination with upper and lower systems of projection lenses both adapted to be focused upon the same screen and a source of illumination positioned to cast its rays of light rearwardly in a direction away from said screen and at an acute angle to the axes of said lens systems to illuminate objects positioned to receive and reflect light rays into the lower system of lenses, of a movable reflector located between said holder and the source of illumination and adapted to intercept the light rays and direct them upwardly and a second reflector mounted relatively to the first mentioned reflector and the axis of the upper lens system for receiving and reflecting the light rays into said lens system.

18. In a projection apparatus, the combination with a pentagonal shaped casing having its five side walls extending vertically, a lamp casing opening into one of said walls and a system of projection lenses in alinement with a contiguous wall, of an opaque object-holder located at a third wall and disposed at an angle to reflect light rays entering one wall into the lenses at the other wall, of a second lens system disposed horizontally above the casing, a movable reflector in said casing adjustable to direct light rays therein upwardly and a second reflector receiving and directing said light rays into the second lens system.

19. An optical projection apparatus having two objectives facing in the same direction, a field adapted to be occupied by opaque projection material in line with one of the objectives, means for directing a beam of light obliquely toward such field to illuminate the said material for opaque projection, means for supporting transparent material in line with the other objective, a mirror adapted to occupy a withdrawn position during use of the apparatus for opaque projection and adapted for transparent projection to be shifted into intercepting relations with said obliquely directed beam and so as to reflect the latter at an angle to the axes of the objectives, and a second mirror which receives the reflecting beam and sends it through the transparent material and the other objective when the apparatus is used for transparent projection.

20. An optical projection apparatus having two objectives facing in the same direction, a field adapted to be occupied by opaque projection material in line with one of the objectives, means for directing a beam of light obliquely toward such field to illuminate the said material for opaque projection, means for supporting transparent material in line with the other objective, a mirror pivotally mounted and adapted to be swung out of the path of such obliquely directed beam during use of the apparatus for opaque projection and into the said path so as to reflect the beam at an angle to the axes of the objectives, and a second mirror which receives the reflected beam and sends it through the transparent material and the other objective when the apparatus is used for transparent projection.

21. An optical projection apparatus having two objectives facing in the same direction, and substantially parallel, a field adapted to be occupied by opaque projection material in line with one of the objectives, means for directing a beam of light obliquely toward such field to illuminate the said material for opaque projection, means for supporting transparent material in line with the other objective, a mirror adapted to occupy a withdrawn position during use of the apparatus for opaque projection and adapted for transparent projection to be shifted into intercepting relations with said obliquely directed beam so as to reflect the latter at an angle to the axes of the objectives, and a second mirror which receives the reflected beam and sends it through the transparent material and the other objective when the apparatus is used for transparent projection.

22. An optical projection apparatus having two objectives facing in the same direction, the one vertically above the other a field adapted to be occupied by opaque projection material in line with one of the objectives, means for directing a beam of light obliquely toward such field to illuminate the said material for opaque projection, means for supporting transparent material in line with the other objective, a mirror adapted to occupy a withdrawn position during use of the apparatus for opaque projection and adapted for transparent projection to be shifted into intercepting relations with said obliquely directed beam and so as to reflect the latter at an angle to the axes of the objectives, and a second mirror which receives the reflected beam and sends it through the transparent material and the other objective when the apparatus is used for transparent projection.

23. An optical projection apparatus having two objectives facing in the same direction and substantially parallel, the one vertically above the other, a field adapted to be occupied by opaque projection material in line with one of the objectives, means for directing a beam of light obliquely toward such field to illuminate the said material for opaque projection, means for supporting transparent material in line with the other objective, a mirror adapted to occupy a withdrawn position during use of the apparatus for opaque projection and adapted for transparent projection to be shifted into intercepting relations with said obliquely directed beam and so as to reflect the latter at an angle to the axes of the objectives, and a second mirror which receives the reflected beam and sends it through the transparent material and the other objective when the apparatus is used for transparent projection.

24. An optical projection apparatus having two objectives facing in the same direction, a field adapted to be occupied by opaque projection material in line with one of the objectives, means for directing a beam of light obliquely toward such field to illuminate the said material for opaque projection, means for supporting transparent material in line with the other objective, a mirror adapted to occupy a withdrawn position during use of the apparatus for opaque projection and adapted to be shifted into intercepting relations with said obliquely directed beam and so as to reflect the latter at an angle to the axes of the objectives, a second mirror which receives the reflected beam and sends it through the transparent material and the other objective when the apparatus is used for transparent projection, and a condenser lens between the second mirror and the supporting means for transparent material.

25. An optical projection apparatus having two objectives one above the other, facing in the same direction, a field adapted to be occupied by opaque projection material in line with one of the objectives, means for directing a beam of light obliquely toward such field to illuminate the said material for opaque projection, a mirror pivotally mounted above the path of the said obliquely directed beam and adapted to be swung upward into a horizontal position out of said path during use of the apparatus for opaque projection and downward into the said path so as to reflect the beam upward during use of the apparatus for transparent projection, means for supporting transparent material in line with the other objective, and a second mirror which receives the reflected beam and sends it through the transparent material and the other objective when the apparatus is used for transparent projection.

26. An optical projection apparatus having two objectives facing in the same direction, a field adapted to be occupied by opaque projection material in line with one of the objectives, means for directing a beam of light obliquely toward such field to illuminate the said material for opaque projection, means for supporting transparent material in line with the other objective, a mirror pivotally mounted and adapted to be swung out of the path of such obliquely directed beam during use of the apparatus for opaque projection and into said path so as to reflect the beam at an angle to the axes of the objectives, a second mirror which receives the reflected beam and sends it through the transparent material and the other objective when the apparatus is used for transparent projection, an operating handle for said swinging mirror, and a latch for holding it in withdrawn position said latch located and arranged to enable it to be operated by the same hand which holds the operating handle.

WILLIAM L. PATTERSON.

Witnesses:
WILLIAM G. WOODWORTH,
HENRY C. THON.

Copies of this patent may be obtained for five cents each, by addressing the "Commissioner of Patents, Washington, D. C."